US009096362B2

(12) United States Patent
Von Schuckmann

(10) Patent No.: US 9,096,362 B2
(45) Date of Patent: Aug. 4, 2015

(54) DISPENSER FOR PASTY COMPOUNDS

(76) Inventor: Alfred Von Schuckmann, Kevelaer (DE)

( * ) Notice: Subject to any disclaimer, the term of this patent is extended or adjusted under 35 U.S.C. 154(b) by 0 days.

(21) Appl. No.: 14/240,041

(22) PCT Filed: Aug. 16, 2012

(86) PCT No.: PCT/EP2012/066024
§ 371 (c)(1),
(2), (4) Date: Feb. 21, 2014

(87) PCT Pub. No.: WO2013/026769
PCT Pub. Date: Feb. 28, 2013

(65) Prior Publication Data

US 2014/0190995 A1 Jul. 10, 2014

(30) Foreign Application Priority Data

Aug. 24, 2011 (DE) ........................ 10 2011 052 954

(51) Int. Cl.
*G01F 11/00* (2006.01)
*B05B 11/00* (2006.01)
*B65D 83/00* (2006.01)

(52) U.S. Cl.
CPC .......... *B65D 83/005* (2013.01); *B05B 11/0013* (2013.01); *B05B 11/3033* (2013.01); *B65D 83/0033* (2013.01); *B05B 11/0048* (2013.01); *B05B 11/3047* (2013.01); *B05B 11/3097* (2013.01)

(58) Field of Classification Search
CPC ............. B65D 83/0033; B65D 83/005; B05B 11/0013; B05B 11/3033; B05B 11/0048; B05B 11/3047; B05B 11/3097; B05B 11/00
USPC .............. 222/207, 209, 212, 256, 260, 321.7, 222/340, 380, 383.1, 571
See application file for complete search history.

(56) References Cited

U.S. PATENT DOCUMENTS 4,807,784 A * 2/1989 Jupin et al. .................... 222/207
4,991,744 A * 2/1991 Von Schuckmann ......... 222/136

(Continued)

FOREIGN PATENT DOCUMENTS

DE 601 24 244 T2 5/2007
DE 10 2008 029004 A1 1/2009

(Continued)

OTHER PUBLICATIONS

International Search Report of PCT/EP2012/066024, mailed Dec. 7, 2012.

*Primary Examiner* — Frederick C Nicolas
(74) *Attorney, Agent, or Firm* — Collard & Roe, P.C.

(57) ABSTRACT

A dispenser for pasty compounds includes a tubular compound housing having a feeding plunger and a head piece which is guided in a spring-mounted manner on an upper tube piece and has a metering chamber with which there is associated an inlet valve. In order to provide a dispenser of this kind that has improved performance and a simplified construction, it is proposed that a spring element is composed of two U legs which roll down between parallel annular walls of the head piece and the compound housing.

9 Claims, 9 Drawing Sheets

(56) References Cited

U.S. PATENT DOCUMENTS

| | | | | |
|---|---|---|---|---|
| 6,712,243 | B2 | 3/2004 | Rossignol | |
| 7,677,415 | B2 * | 3/2010 | Auer | 222/207 |
| 7,793,803 | B2 * | 9/2010 | Neerincx et al. | 222/207 |
| 7,819,290 | B2 | 10/2010 | Behar | |
| 8,118,195 | B2 * | 2/2012 | Decottignies | 222/207 |
| 8,206,136 | B2 * | 6/2012 | Brouwer et al. | 417/480 |
| 8,360,284 | B2 * | 1/2013 | Carta | 222/207 |
| 2008/0110934 | A1 * | 5/2008 | Behar | 222/207 |
| 2010/0294805 | A1 | 11/2010 | Pohlmann et al. | |
| 2014/0239017 | A1 * | 8/2014 | Von Schuckmann | 222/207 |

FOREIGN PATENT DOCUMENTS

| | | | |
|---|---|---|---|
| DE | 60 2005 005514 | T2 | 4/2009 |
| EP | 1 539 365 | B1 | 3/2006 |
| JP | H10-236503 | A | 9/1998 |
| WO | 20091047827 | A2 | 4/2009 |

* cited by examiner

DISPENSER FOR PASTY COMPOUNDS

CROSS REFERENCE TO RELATED APPLICATIONS

This application is the National Stage of PCT/EP2012/066024 filed on Aug. 16, 2012, which claims priority under 35 U.S.C. §119 of German Application No. 10 2011 052 954.3 filed on Aug. 24, 2011, the disclosure of which is incorporated by reference. The international application under POT article 21(2) was not published in English.

BACKGROUND OF THE INVENTION

1. Field of the Invention

The invention relates to a dispenser for pasty compounds, comprising a tubular compound housing having a feeding plunger and a head piece which is guided on the upper tube piece and has a metering chamber with which there is associated an inlet valve, and for the spring-back of the head piece into the starting position, a spring element is provided which extends from the head piece to the upper tube piece and has a U-shaped end at the level of the inlet valve.

2. Description of the Related Art

Dispensers of the type in question are known. They serve in particular to provide metered discharge of pasty compounds, and furthermore, for discharge of a cream such as toothpaste or a body care cream, for example, a feeding plunger being provided in a container which stores the compound, and the compound being discharged in a metered amount by pumping movement of the head piece. In this context, reference is made to EP 1 539 365 B1, for example. A dispenser of the type in question is known from this patent specification, in which a spring element held between the head piece and the upper tube piece of the compound housing is loaded by user-actuated lowering of the head piece to discharge the compound. Upon cessation of the pressure load applied by the user to the head piece, the latter is moved back into the starting position as a result of the restoring force of the spring element that is built up beforehand. The spring element preferably has a U-shaped portion with respect to a vertical portion, the U-shaped portion extending freely between the tube piece of the compound housing and a circumferential wall of the head piece, a U leg rolling up or down along a conical portion of the tube piece at the compound housing end in the course of the loading and/or relaxation of the spring element.

SUMMARY OF THE INVENTION

Based on the prior art described above, according to one aspect, it is an object of the invention to provide a dispenser for pasty compounds which can be manufactured in a favorable manner, in particular with improved performance of the spring element in comparison with the prior art. Further aspects are set forth with respect to additional features of the invention as explained below. These features may be important independently as well as additionally with respect to the object stated above.

According to a first inventive concept, this object is achieved by the fact that the entire spring element is composed of two U legs which roll down between parallel annular walls of the head piece and the compound housing. The active spring region of the spring element in particular is preferably held in an annular space, which is radially inwardly and radially outwardly delimited by the annular walls of the head piece and the compound housing as a result of the proposed approach, wherein furthermore, the U legs of the spring element are guided by the annular walls that run parallel, in particular in a vertical portion, in the course of the pressure-loaded displacement of the head piece as well as in the course of the moving back of the head piece. Accordingly, the U legs are preferably supported on mutually facing surfaces of the annular walls. This advantageously provides a clearly defined restoring direction in the relaxation direction of the spring element. Due to the parallel alignment of the annular walls supporting the U legs, the U legs roll up or down, preferably in the vertical direction, in the course of the downward movement of the head piece due to pressure applied by the user. This advantageously counteracts a potentially uncontrolled yielding, for example the buckling of at least one of the U legs out of the preferred vertical direction. This advantageously also applies to the spring-loaded moving back of the head piece, in which the spring force that is built up in the course of the downward stroke is achieved by a targeted rolling down by at least one U leg, preferably in the vertical direction.

Additional features of the invention are explained below, also in the description of the figures, often in their preferred association with the subject matter of claim 1 or with features of additional claims. However, they may also be important in association with only individual features of claim 1 or the respective other claims, or independently.

It is therefore additionally preferred in first instance that the inner U leg extending approximately to the U apex is made of a thicker material than the other (outer) U leg.

This advantageously assists in a directed rolling up or down by the spring element in the manner of a rolling bellows. The thicker U leg additionally preferably has a material thickness corresponding to 1.2 to 2.5 times that of the thinner U leg. A material thickness corresponding to that of the U leg of thinner material is additionally preferably selected in the region of the U apex, the U leg of the thicker material preferably extending into the region of the U apex in a starting position of the head piece when it is not actively under a pressure load.

It is additionally preferred that the leg made of the thicker material is located in association with the upper tube piece. The spring element is additionally preferably secured to the upper tube piece of the compound housing by means of a portion adjoining the leg made of a thicker material, in an additional preferred embodiment, this portion forming an annular groove between the radially inner U leg, which is also preferably made of a thicker material, and the fixing region for receiving a portion of the tube piece.

According to a preferred embodiment, it is provided that the spring element is made of a rubber-like resilient plastics material, in particular from a resilient elastomer, additionally in particular from a silicone material. This material offers a satisfactory elastic recovery capability for resilient displacement of the head piece back into the starting position. The spring element is preferably manufactured as an injection-molded plastics part. In forming the spring element from such a plastics material, in particular from silicone, the embodiment of the spring element from two U legs which roll down between parallel annular walls is additionally advantageous in that this results in the smallest possible diffusion surface, in particular when the spring element represents a delimitation of the metering chamber in at least some portions, as is additionally preferred. Accordingly, in such a configuration, the surface of the spring element facing the metering chamber is covered with the compound at least after a first use of the dispenser. The material of the spring element preferably used is diffusible. Due to the configuration of the spring element described above, only the region of the U bend extending between the U legs, also preferably in any vertical position of the head piece, is exposed and accordingly is not covered. Accordingly, the diffusion area is limited only to the region of the U bend. In addition, the portions of the spring element which are also provided, as viewed in the direction of diffusion, are preferably backed with material of the compound housing, of the head piece and/or of the tube piece, so that a diffusion barrier is present here, or they are covered by compound on both sides, at least after initial use of the dispenser.

It is additionally preferred that the spring element is formed in one piece with the inlet valve. The inlet valve is additionally preferably designed with a disk shape and with a centrally positioned conical closure body which is movably supported by webs and which preferably cooperates with a valve seat in the region of the tube piece. According to the preferred embodiment, the inlet valve is also made of a rubber-like resilient plastics material, additionally preferably from a silicone material. In this context, it is additionally preferred that the inlet valve is situated centrally in the inner concentrically extending U leg, additionally preferably within the U leg made of a thicker material.

In an additionally preferred configuration, an outlet valve that operates in alternation with the inlet valve is provided, which outlet valve opens the metering chamber as far as a mouthpiece channel during a downward stroke of the head piece. Such an outlet valve is preferably made of a rubber-like resilient plastics material, which advantageously, as is additionally preferred, provides a one-piece formation of the outlet valve with the spring element. The one-piece configuration of the spring element has preferably proven to be favorable in particular with regard to manufacturing for the outlet valve as well as for the inlet valve, and also favorable with regard to the assembly of the dispenser.

Furthermore, it is preferred that the outlet valve protrudes as a pivotable sealing tongue into the mouthpiece channel, the sealing tongue protruding above the peripheral edge of the outer U leg of the spring element. Accordingly, the sealing tongue preferably represents a partial vertical lengthening of the outer U leg, as seen at least prior to insertion of the spring element into the dispenser. In this regard, it is additionally preferable for the material of the sealing tongue to taper with respect to the outer U leg to thereby provide advantageous bendability of the sealing tongue into a release position when the dispenser is actuated.

The outlet valve, preferably with the sealing tongue protruding into the mouthpiece channel, cooperates with an outlet opening of the metering chamber, whereby furthermore, the sealing tongue in the closed position lies flat against a head piece surface surrounding the discharge opening. It is preferable in this regard that the outlet valve is spring-loaded in the direction of the closed position of the metering chamber. In a preferred embodiment, the spring loading results from the selected material of the outlet valve, in addition in particular from the selected material of the spring element which at the same time forms the outlet valve. For this purpose, the engagement surface surrounding the outlet opening of the metering chamber is preferably inclined in the installed position of the spring element and thus also of the outlet valve, preferably being inclined by an angle of 5° to 7° with respect to the vertical, so that even in the closed position, the sealing tongue is inclined out of the original vertical alignment to a radially outward orientation by a pivot-kink region in the root region of the sealing tongue at the peripheral edge of the outer U leg. This results in pretensioning of the sealing tongue in the direction of the engagement surface of the discharge opening of the metering chamber. As a result of an increase in pressure due to a downward displacement of the head piece and the compound being thereby discharged from the metering chamber, the sealing tongue is pivoted further in the direction of the mouthpiece channel, lifting off from the engagement surface and accordingly releasing the outlet opening, the sealing tongue preferably being moved in an arc-like manner so that it hangs in a curved shape in the course of discharging material in the compound stream.

BRIEF DESCRIPTION OF THE DRAWINGS

The invention is explained below with reference to the accompanying drawings, which however illustrate only one exemplary embodiment. The drawings show.

DETAILED DESCRIPTION OF THE DRAWINGS

Figure 1:
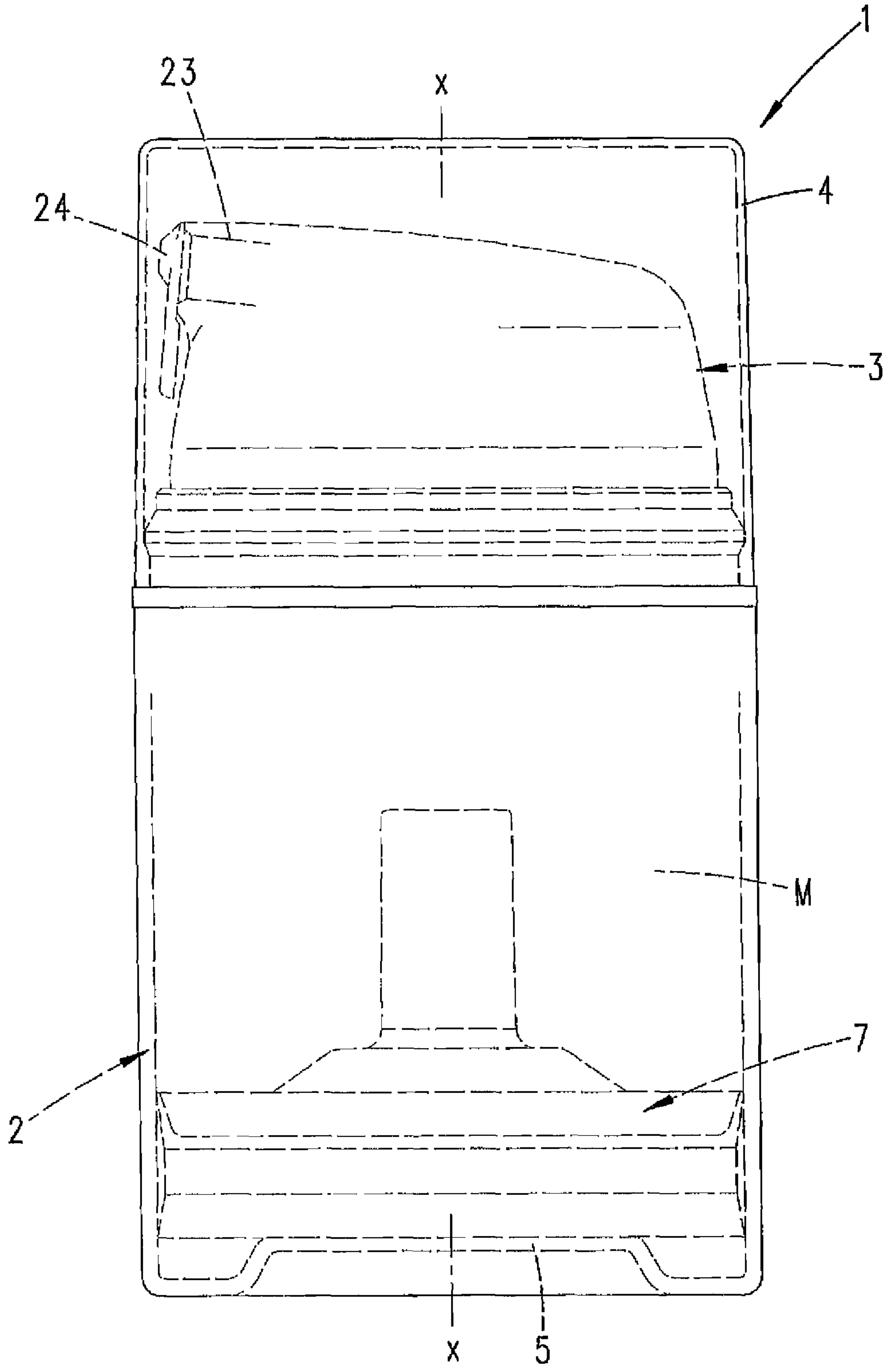
FIG. 1 the dispenser with a closure cap, in a side view.

A dispenser 1 in particular for a pasty compound M is illustrated and described in first instance with reference to FIG. 1. This dispenser 1 substantially comprises a compound housing 2 which stores the compound M, and an actuatable head piece 3.

In a preferred embodiment, as also illustrated, the dispenser 1 has a configuration that is rotationally symmetrical with respect to a central axis x.

Figure 2:
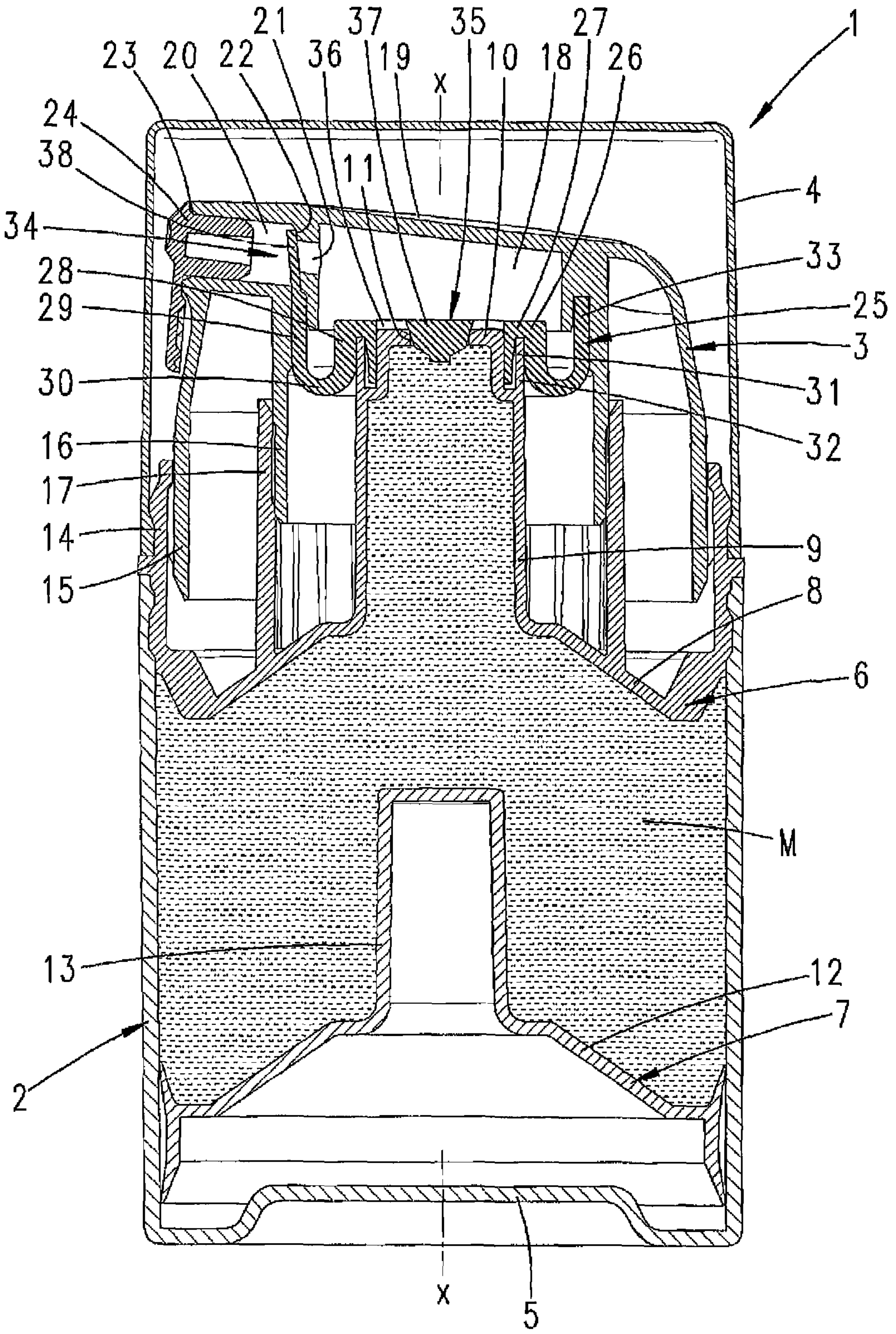
FIG. 2 the vertical section through the dispenser before initial use.

In the non-use position of the dispenser 1, the head piece 3 is preferably covered by a closure cap 4, as also illustrated in FIGS. 1 and 2. This cap additionally preferably has an outside diameter corresponding to the outside diameter of the compound housing 2.

The compound housing 2 has a housing base 5. The opening in the compound housing 2 facing vertically upward is covered by an insert part 6 which is non-separably connected, in particular via a detent connection, to the compound housing 2 in the customary operating state of the dispenser 1, or at least so that it cannot be detached without a tool.

A feeding plunger 7 is also preferably provided in the compound housing 2. The compound M is stored between the feeding plunger and the insert part 6, which covers the compound housing 2 at the top end.

The insert part 6 forms a central tube piece 9 which protrudes beyond the opening plane of the compound housing 2, starting from a conical region 8. In a preferred embodiment, the tube piece has an inside diameter which corresponds to one-third to one-fifth, more preferably one-fourth, of the inside diameter of the compound housing 2. The tube piece top 10 has a central inlet opening 11, With respect to a vertical cross-section through the dispenser 1, the contour of the feeding plunger 7 is substantially adapted to the contour of the insert part 6, so that the feeding plunger 7 accordingly also forms a tube portion 13 which is central with respect to the outside diameter, starting from a conical region 12, and which is adapted to the inside diameter of the tube piece 9.

The insert part 6 is also preferably designed for securing the closure cap 4 with a detent connection, for which purpose the insert part 6 has a circumferential vertical collar 14 which protrudes beyond the opening plane of the compound housing 2 and cooperates with a peripheral lower edge region of the closure cap 4 in the closed position of the cap (cf. FIG. 2).

The vertical collar 14 also serves to guide the head piece 3 in the vertical direction. To this end, the vertical collar 14 cooperates with an outer side of an annular wall portion 15 of the head piece 3 which is aligned vertically with reference to the illustrations. In addition, a radially inner guide is associated with this radially outer guide. An annular wall 16 on the head piece end cooperates here with an annular collar 17 of the insert part 6 which extends between the tube piece 9 and the vertical collar 14.

Due to the guidance described above, the head piece 3 can be displaced in the vertical direction relative to the insert part 6, and thus relative to the compound housing 2, with corresponding guidance, the vertical displacement being stop-limited vertically downwardly as well as vertically upwardly.

The head piece 3 has a metering chamber 18 which is situated substantially above the tube piece 9 on the insert part end and/or on the compound housing end, at least in the nonloaded position of the head piece 3. The metering chamber 18 is delimited circumferentially, with respect to the axis x, substantially by the annular wall 16, the annular wall 16 having a thickened area in the region of the metering chamber 18. A delimitation of the metering chamber 18 at the top is provided by a head piece top 19, which at the same time provides an operating surface for the action of pressure on the head piece 3, preferably by finger actuation, for discharging the compound M.

The metering chamber 18 opens, or at least tends to open, substantially radially outwardly into a mouthpiece channel 20. For this purpose, an outlet opening 21 is formed in the region of the annular wall 16 associated with the mouthpiece channel 20 and/or in the region of its thickened area at the head piece top end. This outlet opening has a reduced diameter in comparison with the inside diameter of the mouthpiece channel 20.

In addition, a central axis of the mouthpiece channel 20 preferably runs in parallel alignment with an actuating plane of the head piece top 19, more preferably forming an acute angle of 10° to 15° with respect to a transverse plane relative to the axis x, as also illustrated.

The engagement surface 22, which faces toward the mouthpiece channel 20 and surrounds the outlet opening 21, extends at an acute angle of 5° to 7° with respect to a vertical plane running parallel to the axis x with regard to a vertical cross-section.

The mouthpiece channel 20 is additionally preferably closed before initial use of the dispenser 1, in particular as a tamper-proof seal, by means of a stopper 24 which protrudes through the discharge opening 23.

All the components of the dispenser 1 described above are preferably molded parts made of a plastics material, in particular a hard plastics material, these parts additionally preferably being manufactured by an injection molding process.

A spring element 25 is provided for the preferred automatic return displacement of the head piece into the starting position after a vertically downward displacement of same, which is required for discharging the compound. At the same time, the spring element serves as a sealing element for sealing in particular the metering chamber 18, thereby forming the base of the chamber, which is opposite the head piece top 19. For this purpose, the spring element 25 is made of a rubber-like resilient plastics material, more preferably from a silicone material.

Figure 9:
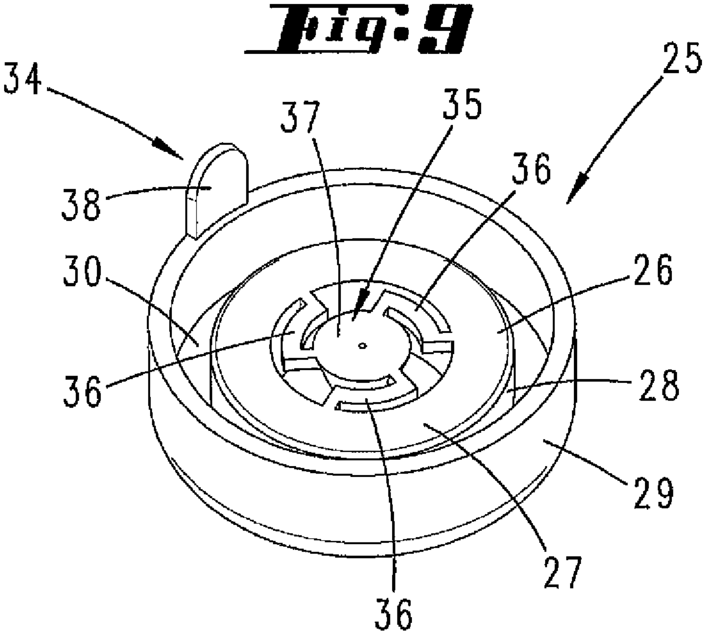
FIG. 9 a perspective detail illustration showing a spring element of the dispenser with inlet valves and outlet valves formed in one piece with the spring element.
Figure 10:
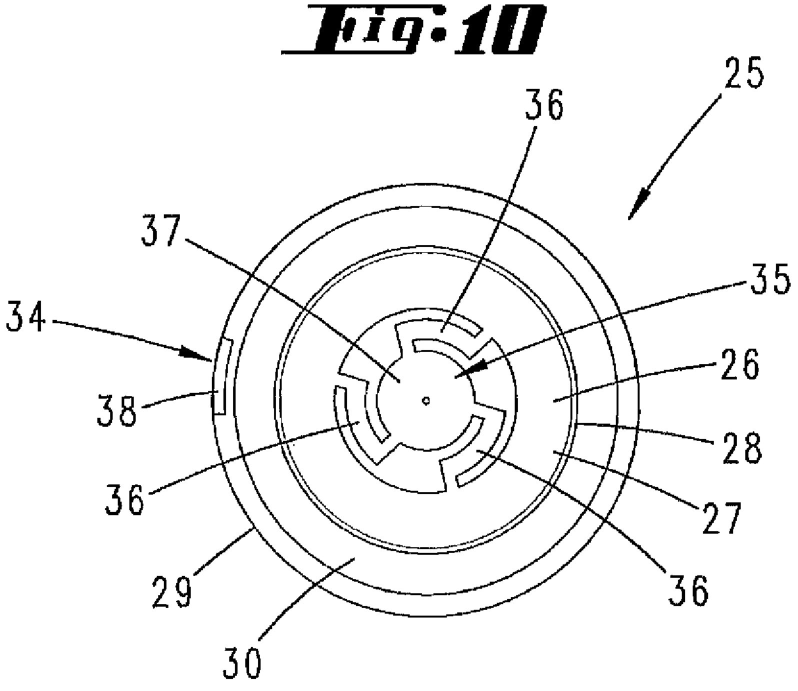
FIG. 10 the spring element in a top view.

The spring element 25 shown in detail illustrations in FIGS. 9 and 10 is designed in first instance to be substantially rotationally symmetrical, and in first instance has a central pot-shaped securing portion 26, having a top 27 which is aligned transversely with respect to the axis x in the installed state, and having a downwardly directed peripheral wall which begins at the top 27. A further annular wall is provided at a radially outer distance from this wall, the two walls forming U legs 28, 29 with respect to a vertical cross-section, these U legs being connected to one another via a U bend 30. This is the case for a U opening that points upwardly in the direction of the metering chamber 18 in the installed position of the spring element 25.

The spring element 25 is held in the region of the tube piece top 10, for which purpose a circumferential freely-extending web portion 31 of the tube piece 9 engages from beneath into an annular slot formed in the region of the radially inward U leg 28 of the spring element 25 on the inside. The U leg 28 lies substantially circumferentially against the outer surface of the annular wall 32 of the tube piece 9, the annular wall 32 at the same time forming the web portion 31 in the extension.

The radially outer U leg 29, which in the vertical section is oriented parallel to the U leg 28 running concentrically with respect to the axis x, lies with its peripheral outer surface against the facing inner surface of the annular wall 16 at the head piece end, and in addition, the free peripheral edge 33 of the U leg 29, which points upwardly in the installed position, is held in a slot-shaped receptacle in the thickened region of the annular wall 16.

In a basic position of the spring element 25 which is not under load during operation according to the illustration in FIG. 2, for example, the edge 33 protrudes beyond the plane of the top 27 of the spring element 25.

Both U legs 28 and 29 are guided between the two parallel annular walls 16 and 32 of the head piece 3 and the compound housing 2 and/or the insert part 6, due to the configuration and formation described above, so that in the course of the downward displacement of the head piece 3 due to the pressure acting on the head piece top 19, the U legs 28 and 29 roll up and down along the associated annular walls 16, 32. The spring element 25 acts in the manner of a roller bellows. In the course of a user-activated downward displacement of the head piece 3, a spring force is built up via the roller bellows-like spring element 25, this spring force being utilized for automatically restoring the head piece 3 to the starting position after cessation of the pressure acting from the outside. A defined restoring direction in particular of the U leg 29 which moves the head piece 3 back, is provided due to the parallel guidance of the U legs 28 and 29 by the annular walls 16 and 32. The force acting on the head piece 3 in the course of the restoring movement is directed substantially parallel to the displacement direction.

In a preferred embodiment, the radially inner U leg 28 is made of thicker material compared to the radially outer U leg 29, in particular with respect to a basic position according to FIG. 2, which position is under no load operationally, starting from the top 27 of the spring element 25 and extending to the U apex in the region of the U bend 30. The U leg 28 is preferably provided with a material thickness corresponding to approximately 1.5 to 2 times the material thickness of the radially outer U leg 29.

In an advantageous embodiment, the spring element 25 is formed in one piece with, and made of the same material as, an outlet valve 34 as well as an inlet valve 35. With respect to the inlet valve 35, this is a valve which is designed in the form of a plate substantially in the region of the top 27 of the securing portion 26, the valve having a centrally positioned conical closing body 37, which is movably supported by webs 36. In a basic position of the dispenser 1, the closing body sealingly closes the inlet opening 11 of the tube piece 9 on the compound housing end, the webs 36 which carry the conical closing body 37 being supported substantially, at least partially, on the upper side of the tube piece top 10.

The outlet valve 34 operates in alternation with the inlet valve 35, and is designed as a pivotable sealing tongue 38 which protrudes, with respect to a vertical section in prolongation of the U leg 29, from the peripheral edge 33 formed by the radially outer U leg 29. This sealing tongue 38 has tapering of the material with respect to the U leg 29 carrying it, preferably having a material thickness corresponding to 0.5 to 0.8 times the thickness of the material of the U leg 29.

The sealing tongue 38 passes through a slot formed in the connecting region of the U leg 29 in the thickened portion of the annular wall 16 and into the mouthpiece channel 20 for engagement of the sealing surface facing the outlet opening 21 against the engagement surface 22 surrounding the outlet opening 21. Due to the position of the engagement surface 22 at an acute angle, the sealing tongue 28 is accordingly under a spring load in the direction of the closed position of the outlet opening 21 in comparison with the nonloaded alignment of the sealing tongue 38 in the uninstalled state.

Figure 3:
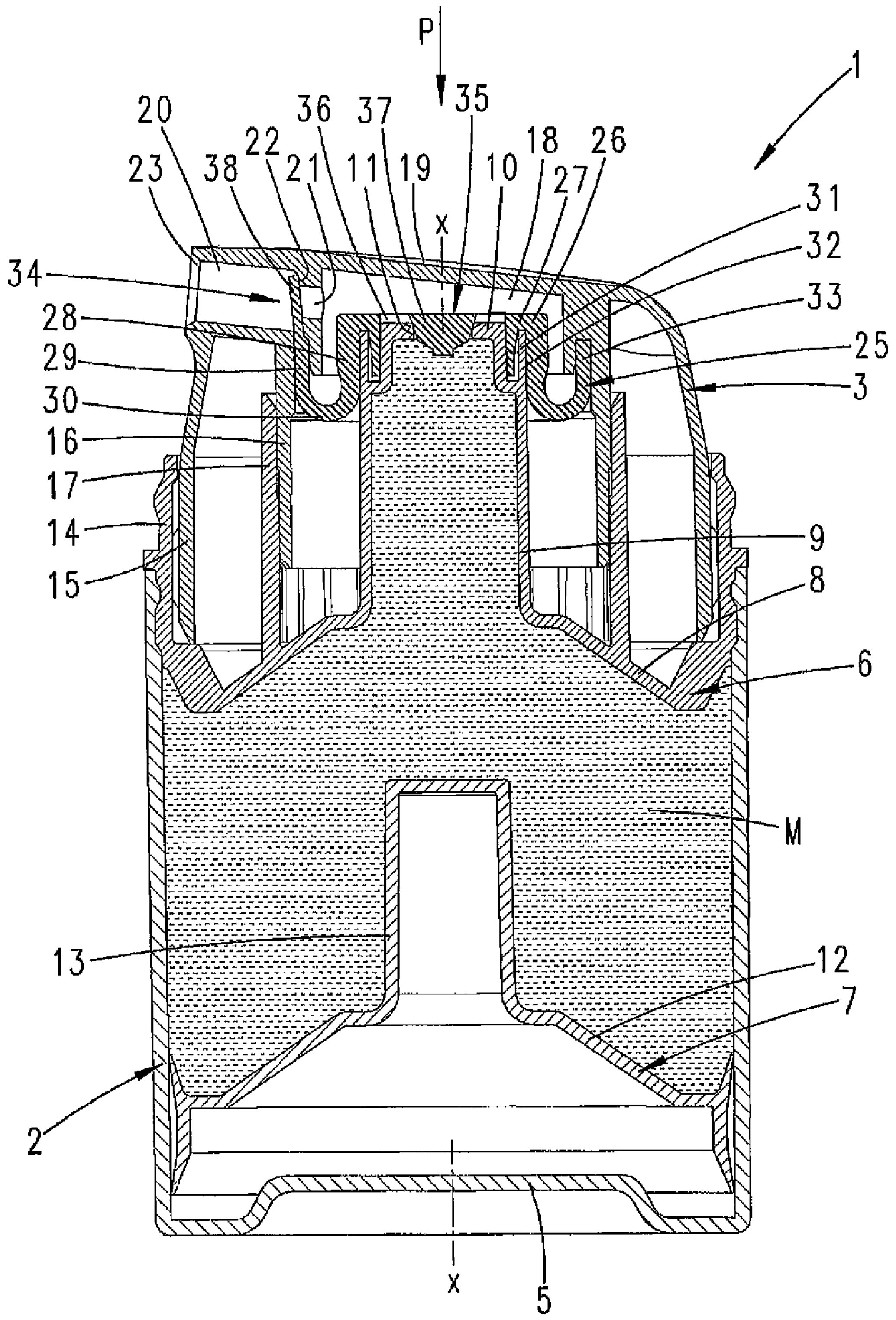
FIG. 3 an illustration corresponding to FIG. 2, but after removal of the closure cap as well as a stopper sealing the mouthpiece channel of the dispenser before initial use, relating to an intermediate position in the course of moving the head piece to actuate the dispenser.
Figure 4:
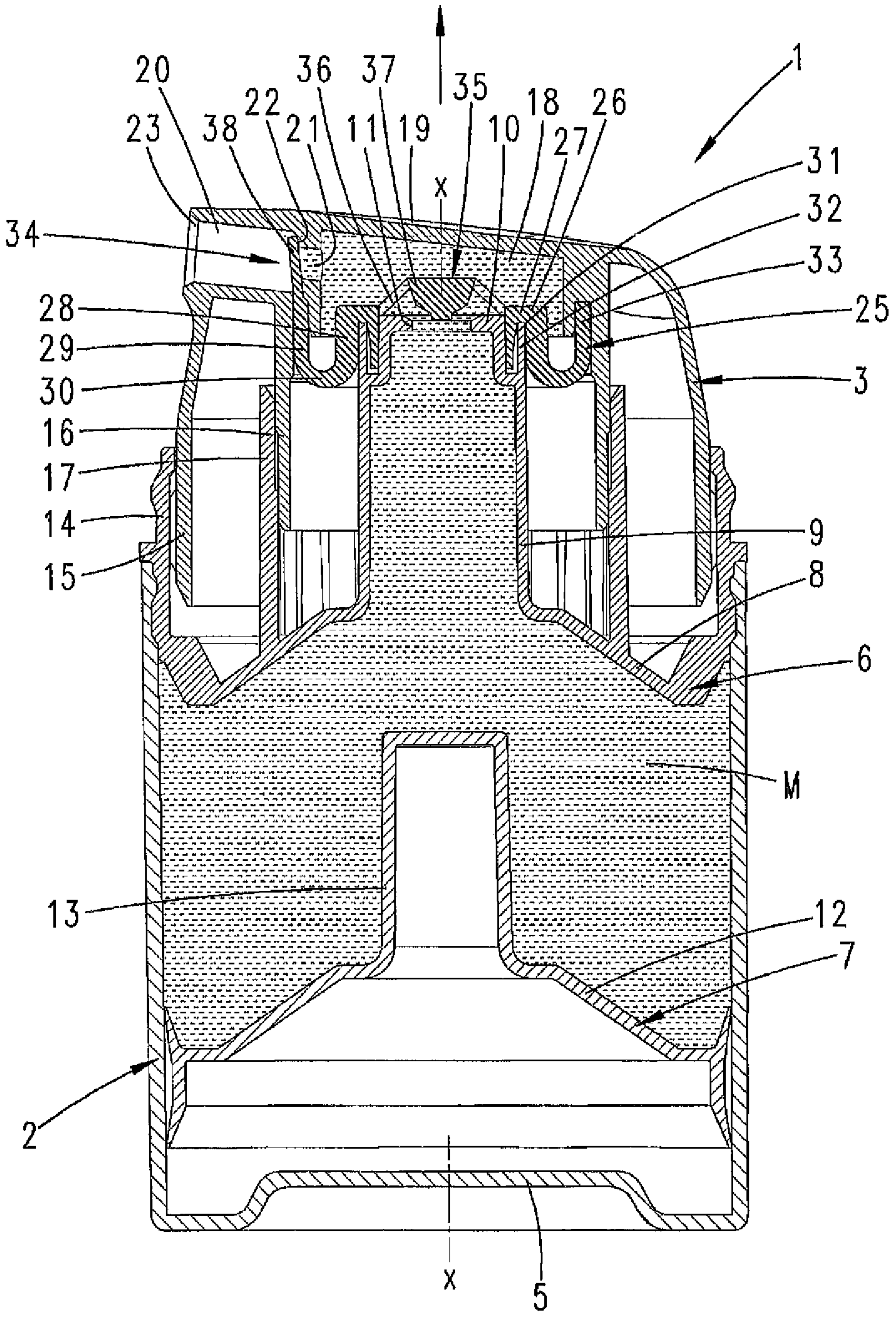
FIG. 4 an illustration corresponding to FIG. 3, relating to an intermediate position in the course of moving the head piece back into the starting position.
Figure 5:
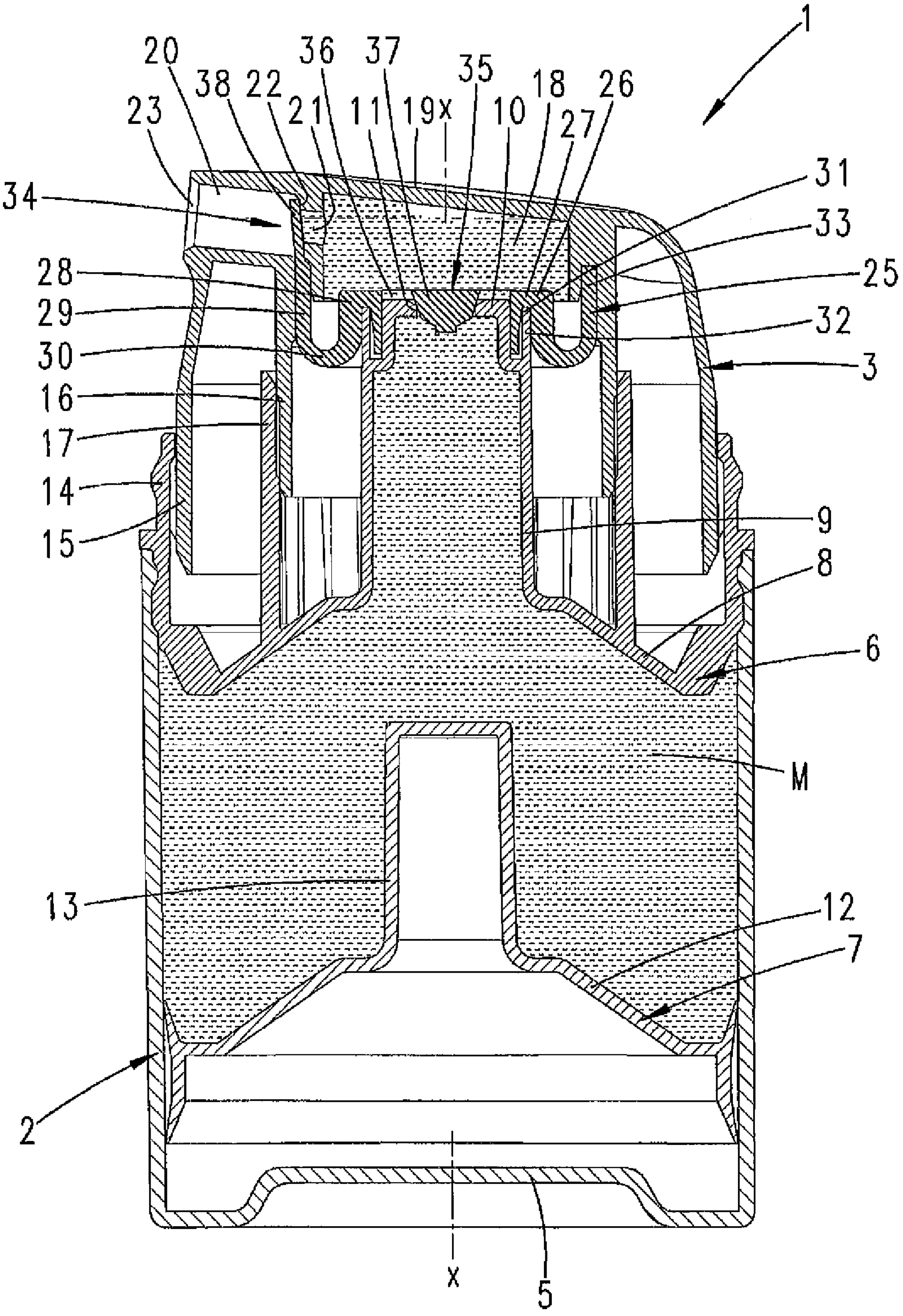
FIG. 5 an illustration subsequent to FIG. 4, pertaining to the end position of the head piece after being moved back, upon initial filling of a metering chamber.

FIGS. 3 to 5 illustrate positions of the dispenser 1 in the course of initial use. It can be seen here that, according to the illustration in FIG. 3, the compound M is located only in the compound housing 2 prior to initial use. Accordingly, an initial filling of the metering chamber 18 is to be performed. This is done by the customary actuation of the head piece 3 by displacing it downwardly relative to the compound housing 2 due to the pressure applied in the direction of the arrow P. This is additionally carried out against the force of the spring element 26, which automatically causes a restoring of the head piece 3 to the starting position after the applied pressure has been released. In the course of this moving back to the starting position, the compound M is drawn into the metering chamber 18 with a corresponding displacement of the inlet valve 35 and/or of the conical closing body 37 into a position releasing the inlet opening 11. For complete filling of the metering chamber 18 according to the illustration in FIG. 5, it is preferably necessary to actuate the head piece 3 two to three times (pump actuation) according to the illustration in FIG. 5.

The dispenser 1 is then ready for the first metered discharge of compound M.

Figure 6:
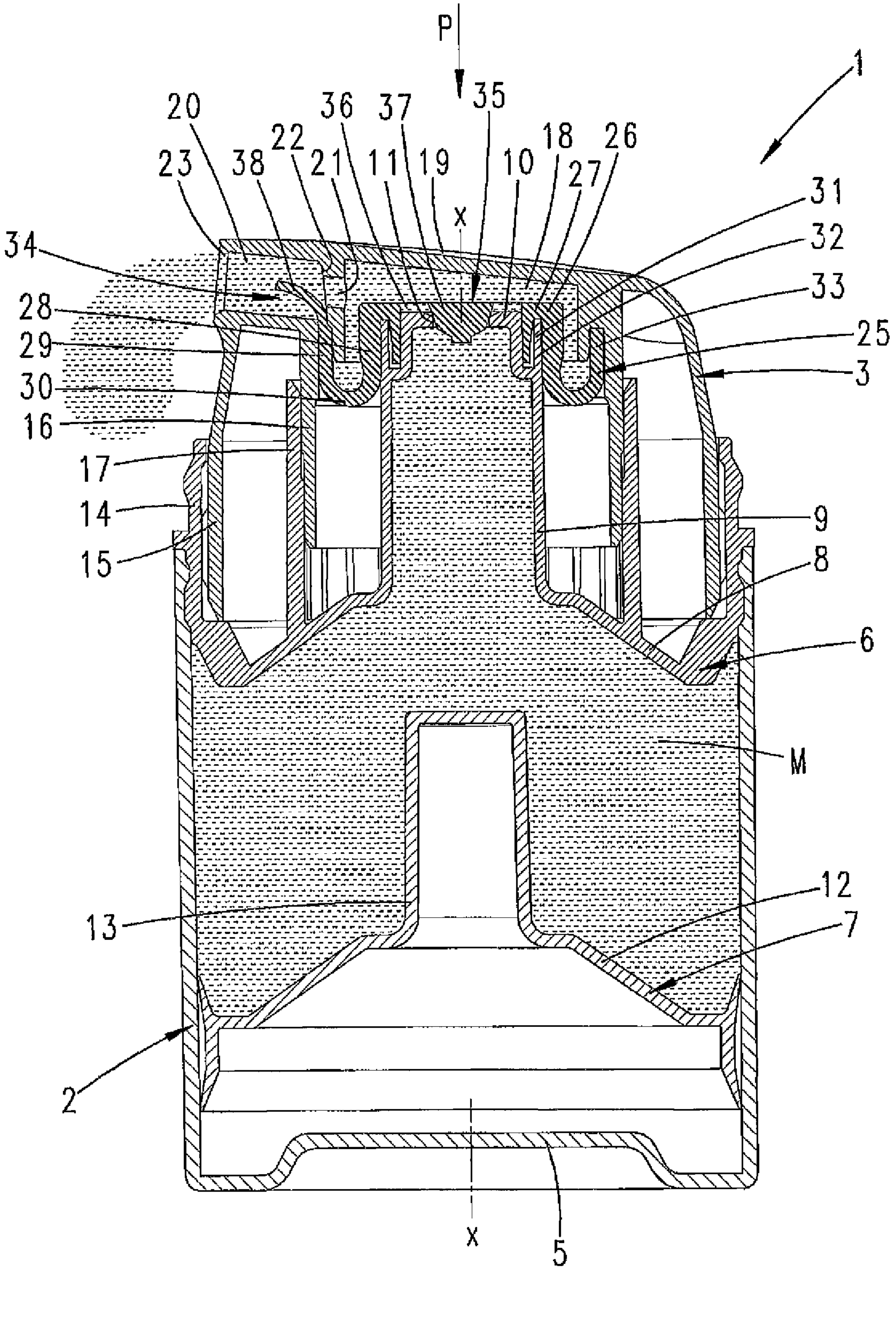
FIG. 6 an illustration corresponding to FIG. 3, but showing a metered discharge of the compound achieved as the result of filling the metering chamber.

FIG. 6 illustrates such a metered discharge of compound. By applying pressure in the direction of the arrow P with a corresponding lowering of the head piece 3, the compound M is conveyed outwardly under a compressive pivoting displacement of the sealing tongue 38 of the outlet valve 34, through the outlet opening 21 and the mouthpiece channel 20, for discharge in the region of the discharge opening 23 due to the associated increase in pressure in the metering chamber 18. The sealing tongue 38 then bends in the flow of the compound M, additionally preferably starting from the connecting region at the edge 33 of the spring element 25 at the foot, with a curved deflection as seen in the vertical section.

A dispensing volume of 0.8 to 1.5 mL of compound M is preferably achieved in this way.

The vertically lowest position of the head piece 3 is limited by a stop, as previously described. The spring force of the spring element 25 which is built up during the downward displacement of the head piece 3 is utilized for automatically moving the head piece 3 back into the starting position of the head piece, as illustrated in FIG. 6, whereby in the course of moving back, due to the suction effect, the metering chamber 18 is again filled with the compound M with a corresponding displacement of the outlet valve 34 into the release position. At the same time, due to a lack of flow acting on the sealing tongue 38, the latter is displaced back into the closed position of the outlet opening 21 due to the prestressed installed position of the sealing tongue, this displacement being further assisted due to the suction effect which begins when the head piece 3 moves back, and additionally also inducing at least partial intake of compound M remaining in the mouthpiece channel 20 in an advantageous manner. This suction/moving back of the residual amount of compound M remaining in the mouthpiece channel 20 assists the sealing tongue 38 in moving back into the closed position.

Figure 7:
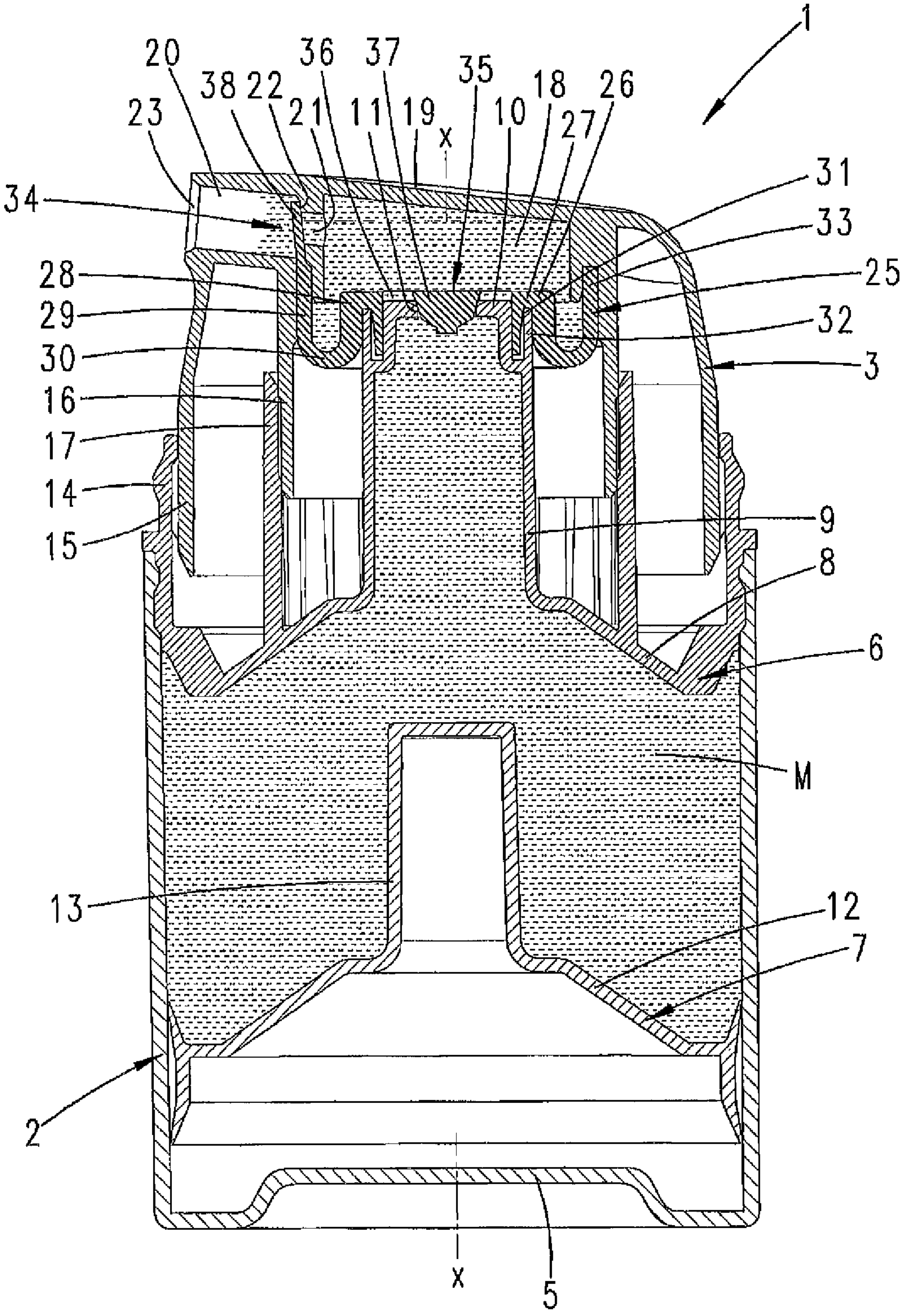
FIG. 7 an illustration subsequent to FIG. 6, relating to the end position of the head piece after being moved back after refilling of the metering chamber.

In the discharge-ready position according to the illustration in FIG. 7, the metering chamber 18 is filled with the compound M up to the circumferential U-shaped region of the spring element 25. Diffusion may occur due to the spring element material, in particular with a prolonged standing time of the dispenser 1, which is thus in readiness. This negative effect is counteracted by the significantly reduced diffusion surface of the spring element 25 in comparison with the approach from the known prior art. The diffusion surface extends only over the immediate region of the U bend 30 of the spring element 25. All other regions of the spring element 25 are covered with material, at least at the rear, i.e., facing away from the compound M, so that diffusion is counteracted over these regions. Additional regions of the spring element 25 are covered by the compound M on both sides, in particular in the readiness position of the dispenser 1.

Figure 8:
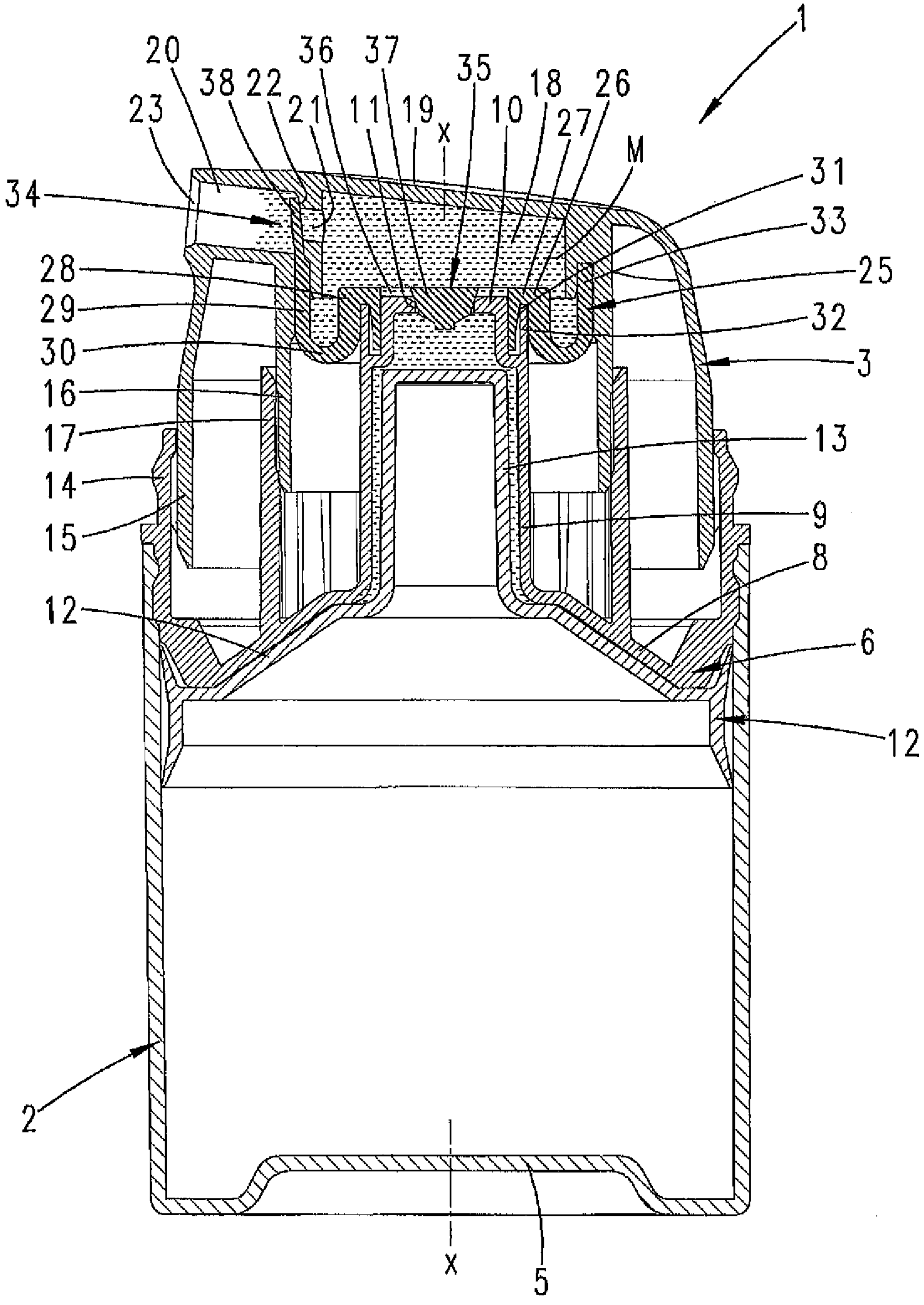
FIG. 8 an illustration corresponding to FIG. 7, showing a situation after emptying of the compound housing that stores the compound.

FIG. 8 shows the empty position of the dispenser 1, in which the plunger 7, which follows in the course of the individual dispenser operations, enters into a stop position with the insert part 6, the tube portion 13 on the feeding plunger side entering deeply into the tube piece 9 of the insert part 6. FIG. 8 shows a position in which the metering chamber 18 is still completely filled and the discharge of a metered amount of compound M is accordingly still allowed. The proposed dispenser 1 has a small residual emptying amount, preferably less than 2.6 mL.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS/CHARACTERS

1 Dispenser
2 Compound housing

3 Head piece
4 Closure cap
5 Housing base
6 Insert part
7 Feeding plunger
8 Conical region
9 Tube piece
10 Tube piece top
11 Inlet opening
12 Conical region
13 Tube portion
14 Vertical collar
15 Annular wall portion
16 Annular wall
17 Annular collar
18 Metering chamber
19 Head piece top
20 Mouthpiece channel
21 Outlet opening
22 Engagement surface
23 Discharge opening
24 Stopper
25 Spring element
26 Securing portion
27 Top
28 U leg
29 U leg
30 U bend
31 Web portion
32 Annular wall
33 Edge
34 Outlet valve
35 Inlet valve
36 Web
37 Conical closing body
38 Sealing tongue
x Axis
M Compound
P Pressure

The invention claimed is:

1. A dispenser for pasty compounds, comprising a tubular compound housing having a feeding plunger and a head piece which is guided relative to an upper tube piece and has a metering chamber with an inlet valve and a mouthpiece channel associated with the metering chamber, a spring element which extends from the head piece to the upper tube piece being provided for a spring-back of the head piece into a starting position, which extends between parallel annular walls of the head piece and the compound housing and engages between the parallel annular walls with legs, and which opens and closes the mouthpiece channel when the head piece is actuated, wherein a plurality of engaging limbs of the spring element form a U-space which is open toward the metering chamber, an outer limb of the plurality of limbs continuing upwardly into a sealing tongue that extends into the mouthpiece channel, the sealing tongue pivoting away in an opening direction in a presence of emptying pressure.

2. The dispenser according to claim 1, wherein an inner U leg of the legs extending approximately to a U apex is made of a thicker material than another U leg of the legs.

3. The dispenser according to claim 2, wherein the inner U leg having the thicker material is located in association with the upper tube piece.

4. The dispenser according to claim 1, wherein the spring element is made of a rubber-like resilient plastics material.

5. The dispenser according to claim 1, wherein the spring element is formed in one piece with the inlet valve.

6. The dispenser according to claim 1, wherein the inlet valve is situated centrally inside an inner U leg of the legs.

7. The dispenser according to claim 1, wherein an outlet valve which operates in alternation with the inlet valve is provided and which opens the metering chamber to the mouthpiece channel during a downward stroke of the head piece, and the outlet valve is formed in one piece with the spring element.

8. The dispenser according to claim 7, wherein the outlet valve protrudes as a pivotable sealing tongue into the mouthpiece channel, the pivotable sealing tongue protruding above a peripheral edge of an outer U leg of the legs.

9. The dispenser according to claim 7, wherein the outlet valve is spring-loaded in a direction of a closed position of the metering chamber.

* * * * *